Sheet 1 - 2 Sheets.
C. Roberts.
Thrashing Mach.
No. 3,486. Fig. 1. Reissued Jan. 8, 1869.
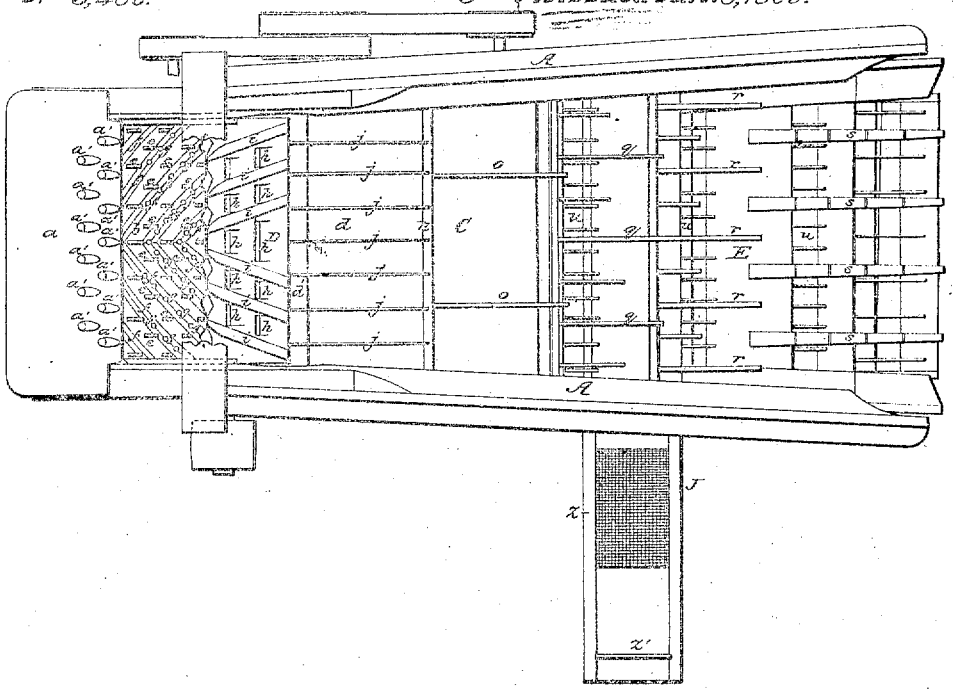
Fig. 2.
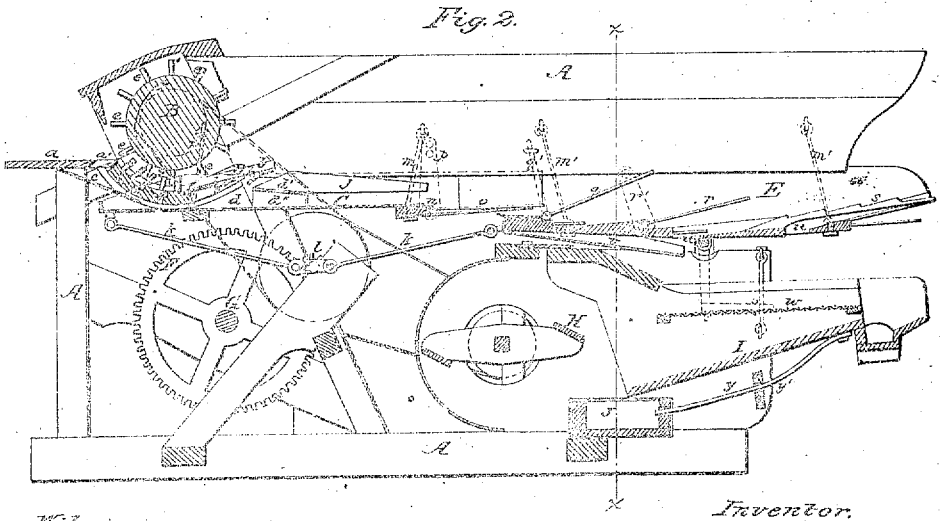
Witnesses.
H. C. Johnson.
W. Renwick Smedley.
Inventor.
Cyrus Roberts.
by his Attorney
R. H. Watson Sheet 2-2 Sheets.

C. Roberts.
Thrashing Mach.

No. 3,486. Reissued Jun. 8, 1869.

Witnesses.
H. O. H. Johnson
W. Renwick Smedberg.

Witnesses.
Cyrus Roberts.
by his Attorney
P. H. Watson

BEST AVAILABLE COPY

UNITED STATES PATENT OFFICE.

CORNELIUS AULTMAN, OF MANSFIELD, OHIO, ASSIGNEE, BY MESNE ASSIGNMENTS, OF CYRUS ROBERTS.

IMPROVEMENT IN MACHINES FOR THRASHING AND SEPARATING GRAIN.

Specification forming part of Letters Patent No. 1,081, dated April 16, 1861; Reissue No. 3,486, dated June 8, 1869.

*To all whom it may concern:*

Be it known that CYRUS ROBERTS, of Belleville, in the county of St. Clair and State of Illinois, did invent certain new and useful Improvements in Grain Thrashers and Separators, of which the following is a full, clear, and exact description, reference being had to the accompanying drawings, making a part of this specification, in which—

Figure 3:
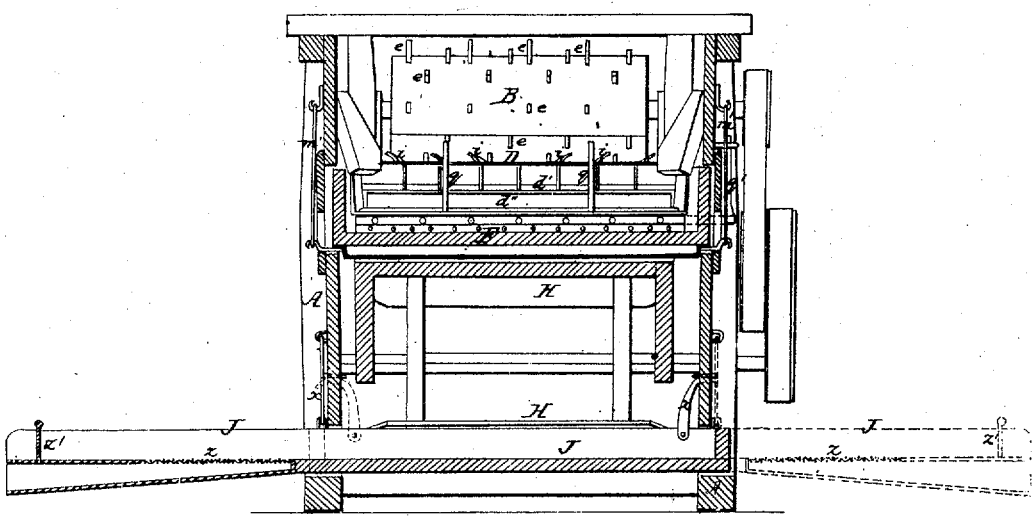
Figure 4:
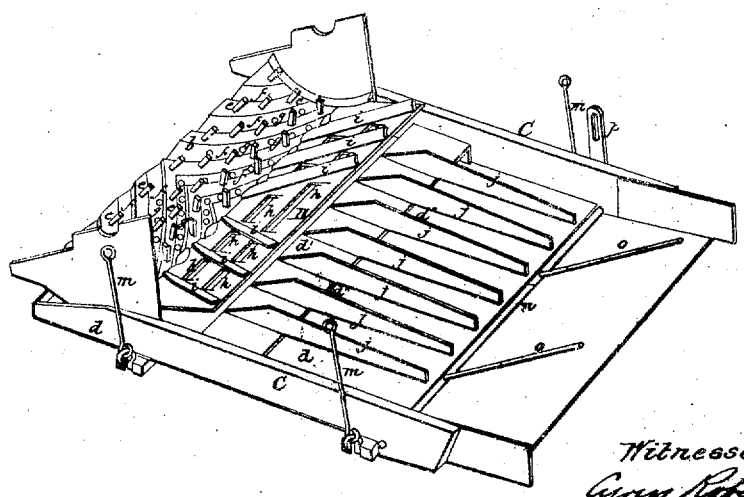

Figure 1 represents a top view of a grain thrasher and separator embracing said improvements. Fig. 2 represents a vertical longitudinal section of the machine. Fig. 3 represents a transverse section at the line *x x*, Fig. 2, and Fig. 4 represents a view, in perspective, of the rear section of the conveyer, the toothed, grooved, perforated concave, and the ribbed perforated plate in front thereof, showing the construction and relative position of these parts detached from the machine.

The object of the said improvements is more effectually and readily to separate the grain from the straw and chaff; and it consists in, first, the combination, substantially as hereinafter described, of a perforated feed-board and inclined conveying-board and a vibrating separator; second, providing the concave with diverging distributing-grooves; third, the combination, substantially as herein described, of grooves in the concave with supplemental distributing-channels in front of said concave; fourth, the combination of two vibrating conveyers or separators moving in opposite directions with two or more sets of lifting rods or fingers; fifth, the combination of two vibrating conveyers, and one of which extends underneath the cylinder, with lifting-fingers or their equivalents; sixth, the combination of two vibrating conveyers or separators moving in opposite directions with lifting-fingers overlapping the opening between the two conveyers; seventh, the combination of the diaphragm, the fingers attached thereto, and the bottom of the conveyer; eighth, the combination of a vibrating conveyer provided with throats or openings for the escape of the grain through the bottom thereof, with fine separating-fingers and coarse lifting-fingers over said openings; ninth, the combination substantially as described, of a head-trap with a wire screen, to be used when thrashing wheat.

In the accompanying drawings, A represents the main frame of the machine, which is gradually widened from rear to front; B, the thrashing-cylinder, which is caused to revolve rapidly in the direction of the arrow in Fig. 2 by means of suitable belting or gearing. *a* is a perforated feed-board, located in rear of the cylinder, upon which the sheaf of grain is spread, and from which it is fed in between the cylinder B and the concave *b* beneath it.

That part of the feed board contiguous to the cylinder is furnished with a series of holes, *a′ a′*, through which the loose kernels of grain may pass, which will be separated from the straw as it is spread upon the feed-board, and by the action of the spikes of the cylinder in drawing the straw beneath the cylinder. The kernels of grain that thus pass through the feed-board are received upon the incline *c*, whence they are delivered upon the bottom *d* of the rear section, C, of the conveyer and separator, without first passing through the thrashing apparatus, and therefore without risk of being broken.

The cylinder B and the concave *b* are provided, as usual in thrashing-machines, with teeth or spikes *e*, as shown in the drawings, and, in addition, diverging grooves *f* are arranged in the surface of the concave for the cylinder to beat the grain against, and to distribute the thrashed grain and deliver it more evenly upon the inclined plate D. The concave is also pierced with holes *g*, large enough to allow a portion of the grain to pass through them and fall upon the bottom *d* of section C of the separator.

From the concave the straw, grain, &c., is thrown, by the rapid revolution of the thrashing-cylinder, up a slight incline, D, pierced with openings *h*, through which a portion of the grain passes and is received upon the bottom *d* of section C of the separator. This incline is also provided with diverging channels, formed in the present instance by ribs *i*, fastened to the upper surface of the incline, still further to divide and distribute the mass of straw, &c., and deliver it evenly upon the fingers *j*, so as to facilitate the descent of the grain from it.

The separator, as shown in the drawings, is formed of two sections, C and E, and the rear section, C, is extended back underneath the thrashing-cylinder and concave, to catch the grain falling through the perforations in the latter, as heretofore described. Opposite and simultaneous vibrating motions are given by means of two connecting-rods, *k*, attached to a double crank, *k'*, on a shaft located beneath the rear section, C, which shaft carries a pinion, *l*, gearing with the large toothed wheel F on the main shaft G, which may be driven by a belt or in any other convenient way. The other ends of the two connecting-rods are attached to the rear ends of the two sections of the separator, as shown in Fig. 2. The sections C and E are suspended by means of radius-bars *m m'*, and they thus have a vertical oscillatory motion, as well as a back and forth motion. By the opposite and simultaneous motion of the sections of the separator the momentum and inertia of one part will be counteracted by that of the other, and thus there will not be so great a tendency to jarring and unsteadiness in the frame when the machine is in operation. Other important results are also thereby attained, which will be hereinafter mentioned. The mixed mass of straw, grain, &c., is thrown from beneath the thrashing-cylinder up the inclined plate D, through the openings, *h*, in which much of the grain passes, and diverging ridges on which constantly tend to spread out the mass laterally as it is delivered to the elevated fingers *j*.

The portion of the grain which remains with the mass of straw, &c., is delivered upon the fingers *j*, and more of the grain is here separated from the straw and falls upon the bottom *d* between the fingers. These fingers are so arranged with respect to the bottom of the separator as to carry off the bulk of the straw, while the bulk of the grain is carried by the bottom *d*. They are elevated above the bottom, being attached by their rear ends to a diaphragm or false bottom, *d'*, which forms a part of and vibrates with the rear section of the separator, and carries the fingers with it in its vibrations. A space, *d''*, is thus left beneath the diaphragm *d'* and fingers *j*, through which the grain is carried forward and over the head or shaft *n* of the fingers *o* without obstructing its action. These fingers have thus to lift up only the bulk of straw, &c., which is delivered upon them from the fingers *j*, and their labor is therefore much less than if the whole mass of mixed straw, grain, &c., were delivered to them before this partial separation. The diaphragm or false bottom *d'*, to which the elevated fingers *j* are attached, may be extended forward to the ends of the fingers, and they may be fastened to it throughout their length, but no advantage is gained by so constructing it.

The vibrating lifting-fingers *o* are attached to a rod or shaft, *n*, and are caused to rise on the forward swing of the rear section of the separator and lift and shake the straw, at the same time facilitating its progress through the separator and the separation of the grain from it, and then with the back swing of the section they resume their position upon the bottom of the separator, the motions of the fingers being regulated by and uniform with those of the rear section of the separator, though they only lift and shake the straw on its advance motion.

By the simultaneous opposite motions of the two sections of the separator the mass of straw, grain, and chaff lying across their overlapping ends is drawn out and attenuated in the following manner: As section C of the separator advances the fingers rise and lift the straw, at the same time urging it forward and throwing a portion of the mass upon the front section, E, and when the motion of the section is reversed, and the rear section, C, recedes, the front one, E, at the same time advances and the mass of straw, &c., upon the front section, E, moving forward with it, is drawn away from that upon the rear section, C, because it tends to move back with said section, and thus the mass is drawn out and attenuated whenever the front and rear sections of the separator move toward their respective ends of the machine, and the grain is thus allowed to drop more readily from the straw by its weight and fall into the winnower, as hereinafter described.

The bar or shaft *n*, to which the lifting-fingers *o* are attached, lies in a recess in the bottom of the separator, so as to present no obstruction to the passage of the grain over it, and it has its bearings in the opposite sides of the separator. One end projects beyond its bearings to receive the lower end of a rod or lever, *p*, the upper end of which rests against a pin or passes through a staple in the side of the machine, or is arranged in any convenient way so as not to be permitted to follow the motion of the separator as it vibrates back and forth, while it is free to move up and down, allowing the lower end of the lever and the shaft of the fingers *o* to move back and forth with the separator. By such means the shaft *n* will be caused to oscillate, raising and lowering the fingers uniformly with the forward and back motions of the rear section of the separator. The grain, &c., carried by the bottom *d* of the rear section, C, of the separator is delivered directly upon the front section, E, while the straw and coarse stuff and grain mixed therewith are delivered from the vibrating lifting-fingers *o* to other and successive series of vibrating lifting-fingers, *q* and *r*, which are arranged in the front section, E, of the separator, and are operated by means of rods or levers *q'* and *r'*, in like manner with those attached to section C, already described, and which, in like manner, rise upon the forward swing of the section E, and resume their horizontal position as the section swings back. These fingers give the straw a still further shaking, and effectually separate the grain from the straw before the latter is thrown out at the front end of the front section, E, over the long inclined fingers *s*, the notches in which prevent the straw from slipping back upon the lifting-fingers *r*. The grain, chaff, and fine stuff pass through the apertures or throats *u* in the bottom of section E, and fall upon the incline *v* and upon the riddles of the winnower, as shown at *w*, where the mixed mass is subjected to the action of a fan-wheel, H, as in ordinary winnowing-machines. The apertures or throats *u* are located underneath the lifting-fingers, and have fine fingers over them, which render the separation finer and more complete, and prevent any long straw or coarse stuff from passing through to fall upon the riddles, thereby lessening the labor of the latter in cleaning the grain. The chaff and dust are separated from the grain by the blast from the fan-wheel H, and blown out at the end of the shoe, while the grain, from its weight, falls upon the inclined bottom I of the shoe and is shaken down into the discharging-spout.

The shoe, with the riddles attached, is caused to vibrate rapidly from side to side in any usual or convenient way, but as no claim is made to this portion of the machine it is deemed unnecessary particularly to describe its construction and mode of operation.

The discharging-spout J is reversible, and may be used to discharge the grain at either side of the machine. It may also be removed when desired, so that the machine may more readily be transported from place to place.

The spout is hung upon radius-bars *x*, and is caused by any convenient means to vibrate back and forth, the radius-bars giving it at the same time a vertical oscillatory motion. In this instance its motion is derived from the motion of the shoe by means of a rod or lever, *y*, pivoted, as at *y'*, and attached to the side of the spout. The spout must extend from one side of the machine to the other beneath the lower end of the shoe, so as to catch all the grain that falls from the riddles upon the inclined bottom I of the shoe. It projects some distance beyond the side of the machine, and this projecting portion has a double bottom. The upper or false bottom is generally made horizontal and the lower one inclined. The false bottom has an opening in it as wide as the spout and of any desirable length, over which a screen, Z, is placed when the machine is used for thrashing and cleaning wheat. This screen is shown in Figs. 1 and 3 of the drawings.

When the screen is used a trap or gate, Z', is placed at the end of the upper part of the spout, as shown, the use of which is to catch any kernels of grain from which the straw and chaff may not have been entirely separated, and which are therefore too large to pass through the screen. These, as well as foreign substances which may have passed through the machine, pass over the screen Z and are thrown against the trap Z', which prevents their falling out and mixing with the cleaned wheat which has passed through the screen along the inclined bottom of the spout and out at the end. The matter that accumulates against the trap may be removed from time to time and again passed through the machine. When the machine is used for thrashing and cleaning oats both screen and trap may be removed.

What is claimed as the invention of CYRUS ROBERTS is—

1. The combination of the perforated feed-board *a* with the vibrating conveyer, substantially as specified.

2. Constructing the concave with diverging distributing grooves or channels, substantially as described.

3. The combination, with grooves in the concave, of supplemental distributing grooves or channels in front of the concave, substantially as described.

4. The combination, in a grain-separator, of two separating platforms or shakers, each provided with lifting rods or fingers.

5. Two vibrating conveyers or separators moving in opposite directions for counterbalancing each other, and one of which projects underneath the cylinder, in combination with lifting-fingers, for the purpose set forth.

6. Constructing the separator in sections having opposite and simultaneous vibrating motion, in combination with lifting-fingers overlapping the opening between the sections.

7. The method of separating the grain from the straw by drawing out and attenuating, and at the same time shaking, by means of lifting-fingers, the mass of mixed straw, grain, and chaff over the openings between the sections of the separator, substantially as described.

8. The diaphragm *d'*, the fingers *j*, above the space *d''*, and bottom *d* below, in combination, substantially as described.

9. The combination, with a vibrating conveyer and separator, of fine rods or fingers over the throat of the conveyer, and coarse vibrating and shaking fingers above the finer ones, the coarse fingers shaking up the straw and making a coarse separation, and the fine fingers making it finer and more complete, thereby facilitating the winnowing.

10. The combination of the head trap Z' with a wheat-screen, Z, acting together, substantially as described.

CORNELIUS AULTMAN.

Witnesses:

J. W. JENNER,

V. GUTZWILLER, Jr.